United States Patent
Tkac et al.

(10) Patent No.: US 10,280,483 B2
(45) Date of Patent: May 7, 2019

(54) SOLVENT EXTRACTION OF TRANSITION METALS

(71) Applicants: Peter Tkac, Naperville, IL (US); George F. Vandegrift, III, Crest Hill, IL (US); David A. Rotsch, Montgomery, IL (US)

(72) Inventors: Peter Tkac, Naperville, IL (US); George F. Vandegrift, III, Crest Hill, IL (US); David A. Rotsch, Montgomery, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 715 days.

(21) Appl. No.: 14/826,334

(22) Filed: Aug. 14, 2015

(65) Prior Publication Data

US 2016/0333442 A1  Nov. 17, 2016

Related U.S. Application Data

(60) Provisional application No. 62/160,024, filed on May 12, 2015.

(51) Int. Cl.
| | | |
|---|---|---|
| *C22B 34/00* | (2006.01) | |
| *C22B 34/34* | (2006.01) | |
| *C22B 7/00* | (2006.01) | |
| *C22B 3/26* | (2006.01) | |

(52) U.S. Cl.
CPC .............. *C22B 34/34* (2013.01); *C22B 3/0005* (2013.01); *C22B 7/007* (2013.01); *Y02P 10/234* (2015.11)

(58) Field of Classification Search
CPC .................. C22B 34/34; C22B 3/0005; C22B 3/0043–3/0094

USPC .......... 423/2, 54, 49, 70, 112, 87, 99, 89, 63
See application file for complete search history.

(56) References Cited

U.S. PATENT DOCUMENTS

| | | | | |
|---|---|---|---|---|
| 3,256,057 A | * | 6/1966 | Burwell ................ | C22B 34/36 423/56 |
| 3,725,524 A | * | 4/1973 | Martin ................. | C01G 39/006 423/49 |
| 3,751,555 A | * | 8/1973 | Peterson .............. | C01G 39/003 423/49 |
| 3,770,869 A | * | 11/1973 | Kim ...................... | C01G 39/003 423/54 |
| 8,968,698 B2 | | 3/2015 | Bednarski et al. | |
| 2003/0086864 A1 | * | 5/2003 | Balliett ................ | C01G 39/003 423/606 |
| 2007/0025899 A1 | | 2/2007 | Marcantonio | |
| 2011/0280357 A1 | | 11/2011 | Stevenson | |

FOREIGN PATENT DOCUMENTS

| | | |
|---|---|---|
| CN | 102002589 | 4/2014 |
| EP | 2643490 | 1/2015 |

* cited by examiner

*Primary Examiner* — Steven J Bos
(74) *Attorney, Agent, or Firm* — Cherskov Flaynik & Gurda, LLC

(57) ABSTRACT

The invention provides a continuous method for extracting transition metal, the method comprising: supplying a spent generator liquor comprising transition metal in highly alkaline solution; mixing the liquor with acid thereby generating a solution, wherein the transition metal resides within the solution; combining the solution with an organic liquid comprising tributyl phosphate or other neutral extractant to extract the transition metal within the organic liquid; washing the extracted transition metal in the organic liquid with acid so as to remove non-transition-metal salts from the organic liquid phase; and stripping the washed transition metal loadedorganic liquid phase with hydroxide, water or complexing agent to remove the transition metal from the organic phase.

17 Claims, 3 Drawing Sheets

Mo Purification Generic Solvent Extraction Flowsheet

SOLVENT EXTRACTION OF TRANSITION METALS

PRIORITY

This utility patent application claims the benefits to U.S. Provisional Patent Application No. 62/160,024 filed on May 12, 2015.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to a method to recover metals and more specifically this invention relates to a method for recovering and purifying transition metals from contaminants.

2. Background of the Invention

The daughter product of $^{99}$Mo is $^{99m}$Tc. $^{99m}$Tc is the most commonly used radioisotope for nuclear medicine. It is used in approximately two-thirds of all nuclear medicine imaging procedures.

Most of the world's supply of $^{99}$Mo is produced by fissioning $^{235}$U in high-enriched (generally 93 percent $^{235}$U) uranium targets.

An alternative means to produce $^{99}$Mo is using Mo targets. $^{99}$Mo can be produced in a reactor by the $^{98}$Mo (n, gamma) $^{99}$Mo reaction on a natural Mo target or an enriched $^{98}$Mo target, or by an accelerator using the $^{100}$Mo (gamma, n)$^{99}$Mo reaction on an enriched $^{100}$Mo target. $^{99m}$Tc– also can be produced directly using $^{100}$Mo(p,2n)$^{99m}$Tc. Enriched Mo material ($^{100}$Mo or $^{98}$Mo) is produced from enriching natural Mo and is very expensive. As such, the material needs to be recycled.

One of the ways to separate $^{99m}$Tc from Mo is using commercially available technetium Tc-99m generators such as RADIOGENIX (Na$^{99m}$TcO$_4$) from NorthStar, (Madison, Wis.). RADIOGENIX provides Sodium Pertechnetate Tc-99m injection. Sodium Pertechnetate Tc-99m is an inorganic compound with the formula Na$^{99m}$TcO$_4$. This requires a solution of potassium molybdate (K$_2$MoO$_4$) in approximately 5 moles/liter (M) potassium hydroxide (KOH). Once the $^{99}$Mo is decayed, Mo needs to be recovered from this solution that contains approximately 1.8 kg of potassium (K) per kg of Mo. Keeping in mind that the starting concentration of potassium in the enriched material ($^{100}$Mo,$^{98}$Mo) feedstock is below 100 mg/kg of Mo, and that any recovered Mo must be at least that pure, the aforementioned NorthStar protocol introduces large quantities of potassium that must be removed.

A major supplier of $^{99}$Mo is Nordion, Inc., (Ottawa, Canada) providing 40 percent of the world's supply. However, the Chalk River Laboratories (Deep River, Ontario, Canada) NRU reactor, which produces $^{99}$Mo for Nordion plans to cease production in 2016. There is no U.S. producer of $^{99}$Mo.

A need exists in the art for a process for harvesting and purifying transition metals such as Mo, Tc, Ti, Ga, Sb, Zn, Sn, and Nb. The process should not generate large volumes of secondary waste streams as is now the case with state of the art protocols. The process should have the ability to process large quantities of transition metals in a minimal number of steps (i.e., one or two extraction steps). Lastly, the process should employ a continuous protocol, including recycling of organic extraction liquors, and counter-current solvent extraction techniques.

SUMMARY OF INVENTION

An object of the invention is to provide a method for harvesting and purifying transition metals that overcomes many of the disadvantages of the prior art.

Another object of the invention is to provide a continuous method for extracting transition metals. A feature of the invention is applying aqueous acidic conditions to remove solvent from a feed stock liquor, while isolating the transition metals in an organic phase. An advantage of the invention is that high efficiencies are realized with minimal amounts of secondary waste streams generated.

Yet another object of the present invention is to provide a method to extract and purify molybdenum. A feature of the invention is first acidification of highly alkaline molybdenum solution in acid (a myriad of acids are suitable, with HCl being used here for illustrative purposes), then extracting the solubilized molybdenum using a neutral extractant (e.g., tri-n-butyl phosphate (TBP) which is discussed herein for illustrative purposes only). The term neutral in this instance means that the extracted species is a neutral salt. In other words, the extractant does not function as a charged species (anion or cation), but acts as an agent to solubilize the neutral species in the organic diluent. An advantage of the invention is that the TBP extracts high Mo concentrations (up to about 0.5 M, and typically up to about 0.45 M) with high efficiency (e.g., greater than 97 percent recovery of Mo in one extraction step) while scrubbing out potassium and other non-extractable metals, all in that same step.

Briefly, the invention provides a continuous method for extracting transition metals, the method comprising: supplying a liquor containing analytes of interest (e.g., spent generator liquor comprising transition metals in hydroxide); mixing the liquor with acid thereby generating a solution, wherein the transition metal resides within the solution; combining the solution with an organic liquid comprising a neutral extractant to extract the transition metals within the organic liquid; washing the extracted transition metals in the organic liquid with acid so as to remove potassium salt from the organic liquid phase; and contacting the washed organic liquid phase with hydroxide to remove the transition metals from the organic phase.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method to recover transition metals effectively and achieve the high yields necessary to develop medical isotope feed stocks and other stores. This specification, for illustrative purposes only, details the extraction of molybdenum. For example, the invented technique takes advantage of solubility of Mo solution when acidified using HCl. Using a neutral extractant (e.g. tri-n-butyl phosphate or TBP, discussed herein for illustrative purposes only) the inventors have been able to extract Mo with high efficiency. The extraction, scrub, strip, removal of $NH_4Cl$ steps have been performed in a lab-scale and have resulted in very high Mo recovery and great purification factors for Mo.

The solvent extraction process has been demonstrated at one-third of a full-scale (full scale requirements are to process approximately 400 grams of Mo in one batch) and has also had very high Mo recovery (98%) and excellent purification factors for Mo. (For example, purified Mo product has about 175 ppm K). In one instance during ⅓ scale operations, 130 grams of Mo were processed. The process can be adopted as a continuous process at full scale.

A myriad of neutral extractants are suitable for use with the invented protocol, including, but not limited to phosphorous based extractants with the general formulas $PO_xR_3$, where x can be 1-4, and R is an organic group either bonded directly to phosphorus or through an oxygen. Exemplary species of these extractants include tributyl phosphate (TBP), trioctylphosphine oxide (TOPO), octyl(phenyl)-N,N-di-isobutylcarbamoylmethylphosphine Oxide (CMPO), or high-molecular weight neutral amines with the general formula $NR_3$ where R is an organic group, (e.g., trioctyl amine), or aqueous insoluble oxygen containing organic compounds that contain ether, ketone, ester, and/or amide groups, and combinations thereof. TBP was utilized in experiments by the inventors given its low cost and availability.

Figure 1:
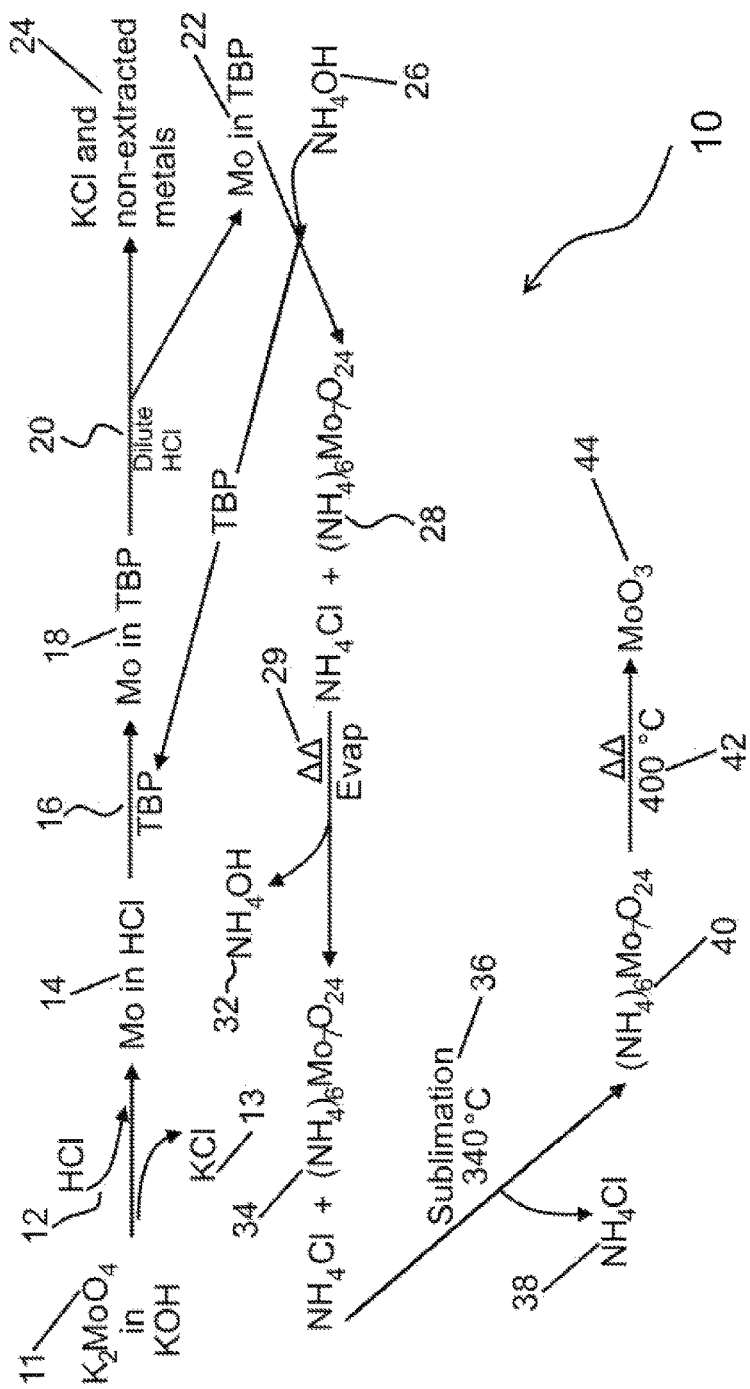
FIG. 1 is a schematic diagram of a transition metal extraction and purification protocol, in accordance with features of the present invention.

FIG. 1 is a schematic diagram of an extraction and purification protocol for transition metals, the protocol designated as numeral 10. FIG. 1 depicts the extraction and purification of molybdenum for illustrative purposes only. Other metals, such as Tc, Ti, Ga, Sb, Zn, Sn and Nb can also be extracted.

In a first step 12, a feedstock 11 of $K_2MoO_4$ in KOH is acidified with hydrochloric acid (at between about 1 and about 12 M concentrations, e.g. 11.7 M) so that the molybdenum salt resides in the acid. By the law of mass action, higher additions of hydrochloric acid enhance the extractability of the molybdenum by TBP (as the dichloride salt) in the next step 16. The relative insolubility of KCl (K is considered the contaminant) causes as much as 20-40 percent of it to precipitate out 13.

The molybdenum-HCl mixture 14 is then contacted with tri-n-butyl phosphate 16 (TBP), resulting in the molybdenum extracted and confined to the organic phase 18. TBP is provided as a mixture with another organic liquid (i.e. diluents), such as, but not limited to, 1-octanol, n-dodecane, and tetrachloroethylene.

The organic phase 18 is subsequently washed or otherwise scrubbed 20 in dilute acid (dilute relative to the acid used in the initial acid solubilization step 12) so as to remove additional KCl, metallic impurities, and non-metallic impurities, 24.

The molybdenum residing in the organic phase 22 is then stripped from TBP using ammonium hydroxide 26. This results in an aqueous solution comprising ammonium molybdate, ammonium chloride, and residual ammonium hydroxide 28.

Preferably, to optimize the purity of the molybdenum, ammonium hydroxide is removed 32, via an evaporation step 29, thereby leaving a mixture of ammonium molybdate and ammonium chloride salts 34. The mixture can be either solid or a saturated solution in ammonium hydroxide.

A sublimation step 36 vaporizes ammonium chloride 38, leaving a solid phase 40 of the molybdenum. Alternatively, differential solubility can be utilized in place of the sublimation step 36.

Additional heating steps 42 (e.g., utilizing approximately 400° C.) of the remaining salt produces $MoO_3$ powder 44.

When the invented method is adopted as a continuous process (i.e., counter current solvent extraction) followed by evaporation and removal of $NH_4Cl$, then recovery of transition metals are enhanced.

EXAMPLE

The following experimental protocol was used to retrieve molybdenum from 700 mL of 200 g-Mo/L in 5M KOH. As such, the protocol is not intended to be limiting, but rather illustrative.

ACIDIFICATION—Step 12 (in FIG. 1): 700 mL of the above solution is combined with about 1.3 L of water and about 2.45 L of concentrated HCl (33-35 percent). Different amounts of water and HCl can be added. Mo can be extracted from HCl in HCl concentrations of from about 1 M to about 10 M.

FILTRATION—Step 13: Solid KCl that forms and any elements insoluble in given HCl concentration are removed by filtration (approximately 30 to approximately 40 percent of any potassium present is extracted here, while Mo stays in the liquid acid (HCl) phase. The inventors found that Mo stays in liquid phase up to about 6 to 7 M HCl. The inventors also found that the solubility of molybdenum species decreases as the concentration of HCl further increases below 7M HCl. In one instance, the inventors extracted 0.35 M Mo from 7.1 M HCl with a distribution ratio (D)=40. (D is the ratio of concentrations of Mo in TBP to Mo in HCl fraction as defined in FIG. 3.

In another instance, the inventors extracted 0.45 M Mo from about 6.2 M HCl with D=35.

EXTRACTION—Step 16: Generally, the invention employs a counter-current solvent extraction protocol, whereby the scrub solution is mixed with the feed solution in the feed stage 20 in FIG. 1. Subsequently, all impurities leave at the same point (raffinate leaving at the first extraction stage.) In a specific embodiment, an aqueous phase (~4.4 L) is contacted with ~4 L of Tributyl phosphate (TBP)

in 1-octanol (tetrachloroethylene or n-dodecane also can be used). While the Mo is extracted by TBP, other impurities and KCl stay in aqueous phase (the remaining potassium, approximately 70 percent, is separated from Mo).

Other extraction steps can be added to maximize the extraction of Mo. For example, the aqueous phase still containing some Mo can be contacted with TBP in 1-octanol or other diluent in a series of countercurrent or serial contacts.

SCRUB—Step 20: TBP phase containing Mo is contacted with HCl to scrub any impurities and low concentrations of K. Aqueous stream contains low K concentration and some Mo (~0.4%). This phase can be mixed with the incoming feed in a countercurrent extraction in the last stage of the extraction section to recover all Mo.

STRIP—Step 26: Mo is removed from TBP phase by contacting with $NH_4OH$ (up to 98 percent of Mo is recovered in this single strip stage) as a mixture 28 of ammonium molybdate and ammonium chloride in residual ammonium hydroxide. Instead of using $NH_4OH$, Mo can also be removed from TBP by water or a myriad of complexing agents. A suitable complexing agent is acetohydroxamic acid. This strip step allows the TBP to be recycled back to the organic phase establishment step, thereby minimizing secondary waste streams and otherwise saving costs.

FINAL PURIFICATION—Step 36: Two different routes can be used for final purification. A preferred route is utilizing the differential solubility of the target moiety in an ethanol-water mixture.

Another route is where ammonium chloride is separated from ammonium molybdate by sublimation. $NH_4Cl$ sublimes at ~338° C. Ammonium molybdate decomposes to $MoO_3$ at ~360° C.

Other Options:

Another option of separating $NH_4Cl$ from ammonium molybdate is to add acetic acid to the strip solution 28. When acetic acid is added, pH of the solution changes from alkaline to acidic, which causes change in speciation of Mo. Under these conditions (low pH), Mo forms a precipitate while $NH_4Cl$ remains in solution. The Mo precipitate is repeatedly (e.g, 2-5 times, depending on purity requirements) washed with acetic acid and dilute ethanol and then air dried.

CONVERSION to $MoO_3$—Step 42: Precipitate is then heated to 300-500° C. to form $MoO_3$ that is suitable for reduction to lower oxides (such as $MoO_2$), and finally Mo metal powder. Preferably, the $MoO_2$ is reduced under a hydrogen atmosphere.

$NH_4Cl$ has higher solubility in mixtures of ethanol and water than does ammonium molybdate. Different mixtures of ethanol-water can be used, for example ranging from 10:90 weight percent ethanol:water to 90:10 ethanol:water. Other alcohols, such as, but not limited to, methanol also can be used. A solid mixture of ammonium molybdate and ammonium chloride is contacted with 50-90 percent ethanol in water at 20-50° C., while the Mo compound stays as a solid. Solid ammonium molybdate is washed with an ethanol/water mixture, air dried and heated at 300° C. and 500° C. to decompose ammonium molybdate and form $MoO_3$. $MoO_3$ is suitable for reduction to lower oxides (such as $MoO_2$), and finally to Mo metal powder.

Figure 2:
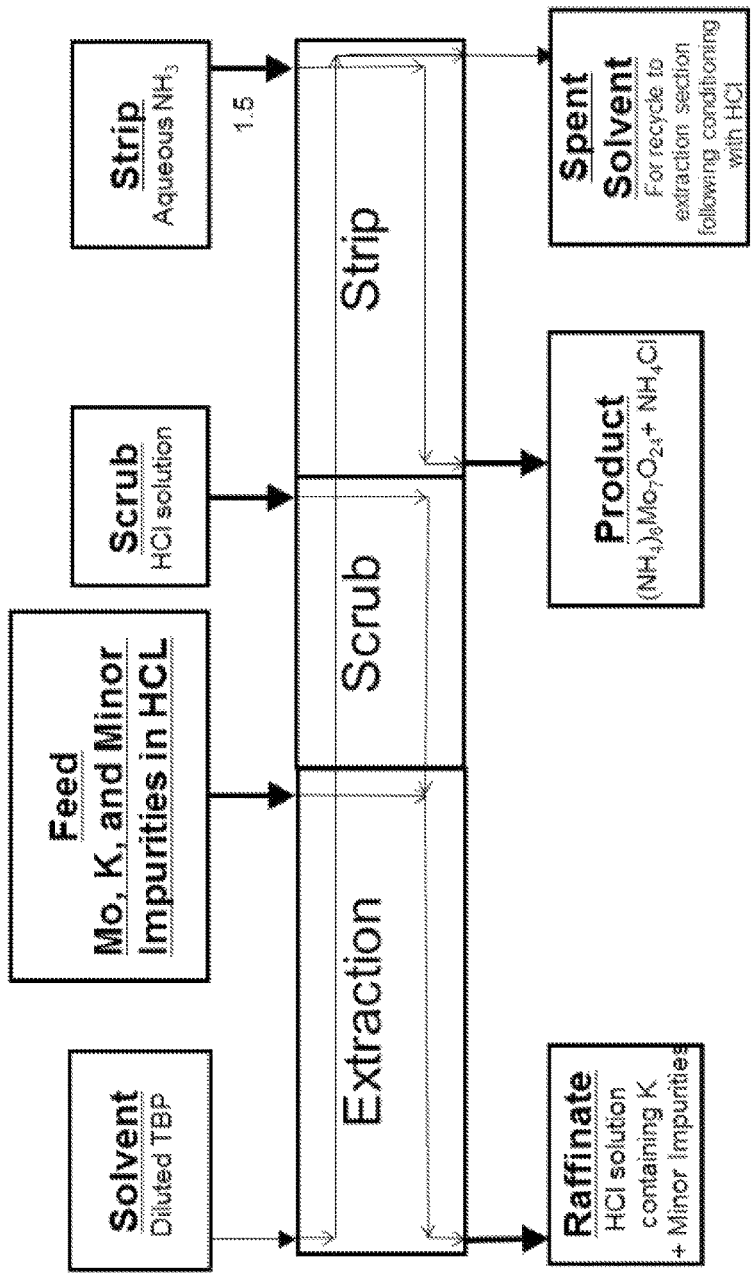
FIG. 2 is a schematic diagram of the extraction protocol for molybdenum, in accordance with features of the present invention.

An example for countercurrent continuous solvent extraction flowsheet for molybdenum is shown in FIG. 2.

For a single stage extraction performed in separatory funnel, the final Mo recovery was approximately 98 percent (one extraction contact/one wash contact/one strip contact). A second stage sequence would recover 98 percent of the remaining 2 percent, a third stage sequence would recover 98 percent of residual, etc. In summary, a counter-current flow protocol can recover as many 9 s of the product that is desired.

For a single stage extraction, final K concentration was approximately 175 mg of K/kg of Mo, when a separatory funnel protocol was utilized. Lower K concentrations are realized when centrifuging force separates the aqueous and organic phases. Alternatively, a second wash recovery will remove another order of magnitude of K from the product, while a third wash will remove still another order of magnitude of K.

Purification factor achieved was 1.1E4. Given this factor, 99.99 percent of the K is removed in the two contacts. Each subsequent wash step would reduce it by a factor of 10 to 100.

Figure 3:
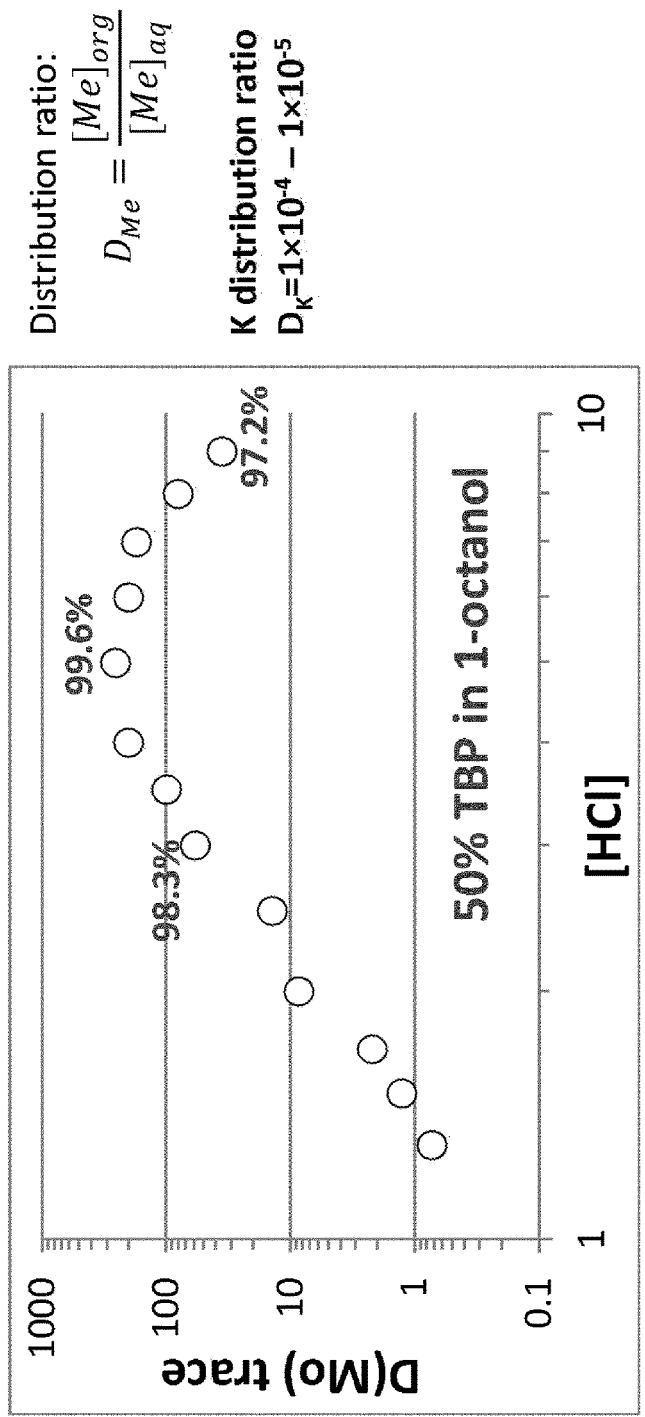
FIG. 3 is a graph showing the dilution profile of molybdenum and hydrochloric acid, in accordance with features of the present invention.

The graph in FIG. 3 shows extraction characteristics of an embodiment of the invented method wherein 1-octanol is utilized as the organic phase. Over the range of 1-10 M HCl, Mo can be extracted into an organic phase to be subsequently separated from other components. The three extraction percentages shown in the graph (98.3, 99.6, 97.2) occurs when equal volumes of organic and aqueous phases are utilized.

The best conditions for extraction of Mo are in 2-9 M HCl with the peak in extraction yields at 4-6M. The concentration of HCl in strip section varies, depending on what needs to be stripped. The concentration of HCl for strip section is less than or equal to the concentration of HCl used for extraction and most likely will be in the range of 2-5M HCl.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least,"

"greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A continuous method for extracting transition metals, the method comprising:
   a. supplying a spent generator liquor comprising transition metal in alkaline liquid;
   b. mixing the spent generator liquor with acid to form an acidic solution of the transition metal;
   c. contacting the acidic solution with an organic liquid comprising a neutral extractant to extract the transition metal into the organic liquid;
   d. washing the extracted transition metal in the organic liquid with hydrochloric acid so as to remove potassium from the organic liquid; and
   e. removing more than 97 percent of the transition metal from the organic liquid from the organic liquid washed in step d.

2. The method as recited in claim 1 wherein the step of mixing the spent generator liquor with acid results in anions of the acid combining with cations of the alkaline liquid to form a salt and precipitate out of the solution.

3. The method as recited in claim 1 wherein the organic liquid is an extractant selected from the group consisting of tributyl phosphate, trioctylphosphine oxide, octyl(phenyl)-N, N-di-isobutylcarbamoylmethylphosphine oxide, and combinations thereof.

4. The method as recited in claim 1 wherein step c further results in potassium salt being confined to an aqueous phase.

5. The method as recited in claim 1 wherein an acid concentration in the washing step is less than or equal to the concentration used in the mixing step.

6. The method as recited in claim 1 wherein the removing step yields organic solution which is recycled to the mixing step.

7. The method as recited in claim 1 wherein the transition metal is an element selected from the group consisting of Mo, Tc, Ti, Ga, Sb, Zn, Sn, Nb, and combinations thereof.

8. The method as recited in claim 1 further comprising subjecting the removed transition metal to sublimation or differential solubility to form a solid phase containing the transition metal.

9. The method as recited in claim 8 wherein the solid phase is a salt of the transition metal.

10. The method as recited in claim 9 wherein the salt is heated to create solid phase oxides of transition metals.

11. The method as recited in claim 1 wherein the step of removing the transition metal from the organic liquid comprises contacting the organic liquid with hydroxide, or water, or a complexant.

12. The method as recited in claim 11 wherein the hydroxide is potassium hydroxide, or sodium hydroxide or ammonium hydroxide, or combinations thereof.

13. The method as recited in claim 12 wherein the lowest molarity of the hydroxide is approximately 0.1M.

14. The method as recited in claim 1 wherein the step of removing the transition metal from the organic liquid comprises contacting the organic liquid with a complexant selected from the group consisting of acetohydroxamic acid, trialkylammonium salts of ethylenediaminetetraacetic acid, triethylenetetraminehexaacetic acid, oxalic acid, and combinations thereof.

15. The method as recited in claim 1 wherein the metal is Mo and the concentration of extracted Mo is up to 0.5M.

16. The method as recited in claim 1 wherein the neutral extractant is a phosphorous based extractant having the general formula $PO_xR_3$, where x is 1-4, and R is an aqueous insoluble oxygen containing organic compounds that contain ether, ketone, ester, amides, or combinations thereof.

17. The method as recited in claim 1 wherein the hydrochloric acid has a concentration of between 1M to 10M.

* * * * *